INVENTOR
*Thomas M. McIntyre*

United States Patent Office 3,347,404
Patented Oct. 17, 1967

3,347,404
HOLDER FOR MULTIPLE COOKING CONTAINERS
Thomas M. McIntyre, 11530 S. Kilbourn Ave., Alsip, Ill. 60658
Filed Sept. 30, 1965, Ser. No. 491,787
4 Claims. (Cl. 220—19)

ABSTRACT OF THE DISCLOSURE

A cooking utensil comprising a holder and a plurality of containers. The holder is formed of generally circular spaced apart upper and lower frames joined by circumferentially spaced vertical wires. The bottom frame includes radially spaced concentric wires to support the containers, and the upper frame is divided into sectors by radially inwardly extending wires. Each of the containers is shaped to be inserted through one of the upper frame sectors and supported by the lower frame. A central wire extends between the centers of the upper and lower frames and its upper end is bent to form a lifting hook. The containers are provided with removable handles and the outer wire of the upper frame is interrupted to permit removal of the handles while the containers are held by the holder.

---

This invention relates to the culinary art, and more particularly to a holder to be used on multiple cooking containers used in this art.

Cookwear is the broad term used in the culinary art to designate all types of cooking pans, including multiple containers in which food is cooked. However, a search through the stores or catalogs will produce multiple cooking containers, none of which are known to be housed in a single basket which can be placed on one burner of a gas or electric stove or the like in order that three separate kinds of food may be heated or cooked at one time. A device of this nature will obviously conserve time and space, something that many housewives have been known to desire.

It is therefore the principal object of this invention to provide a holder for multiple cooking containers in which three separate containers may be placed on a single burner of a stove.

Another object of this invention is to provide a holder for multiple cooking containers which uses but one handle that is instantly adapted to all of the food containers that are placed in this one holder.

Another object of this invention is to provide a holder for multiple cooking containers that is made of rigid wire and therefore will offer a minimum of resistance to the heat before it reaches the cooking containers, thus not in any way delaying the cooking of the food placed in the containers.

Another object of this invention is to provide a holder for multiple cooking containers that can be cleaned easily.

Still another object of this invention is to provide a holder for multiple cooking containers that is so constructed that the food containers placed therein will not become separated by reason of the encircling members of the holder.

Other objects and advantages of this invention will become apparent from the following detailed description taken in connection with the accompanying drawings, wherein.

Figure 1:
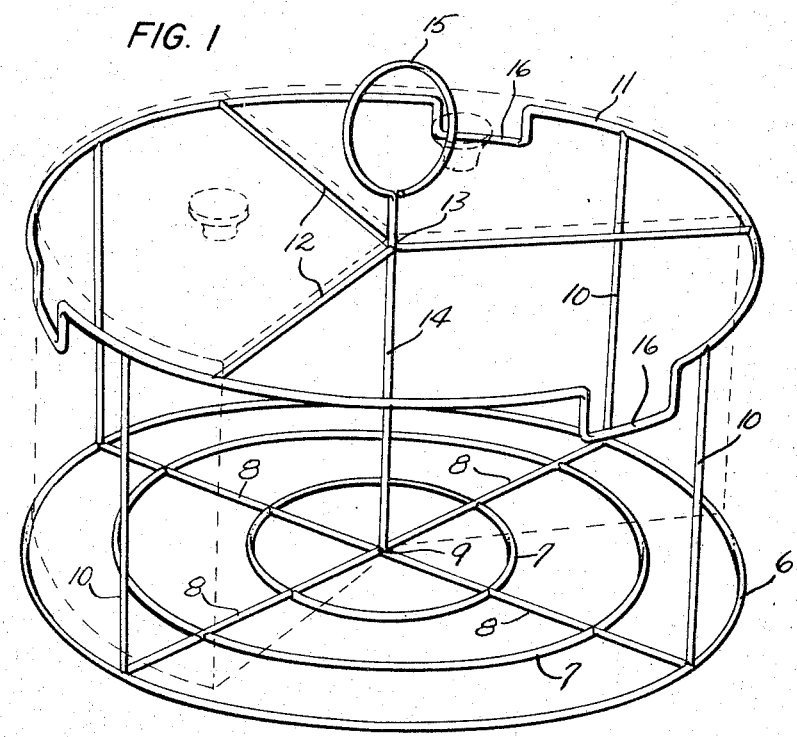
FIGURE 1 is a pictorial view of the holder for multiple cooking containers, two of which are shown in phantom lines.

Referring now to the drawing, it will be seen from an examination of FIGURE 1, that the food container holder 5 is made from rigid metal wire that may be stainless steel or any other desired metal. The aforesaid holder 5 embodies a round bottom frame 6 having a plurality of spaced circular members 7 that are welded or otherwise secured in place to a plurality of radially spaced members 8 that extend out from the center 9 of the aforesaid bottom frame 6 to the periphery of the frame itself to which the outer end of each member is suitably secured.

A vertical wire 10 extends upward from the intersection of each one of the aforesaid radially spaced members 7 with that of the round bottom frame 6. A round top frame of rigid wire 11 rests on and is secured to the upper end of each of the aforesaid vertical wires 10. The just-mentioned round top frame 11 is the same diameter as that of the aforesaid round bottom frame 6 of this invention. Three equally and radially spaced rigid wires 12 extend outward from the center 13 of the just-mentioned top frame 11 of this invention. The outer end of each wire 12 is firmly secured to the aforesaid top frame 11 as will be understood by examination of the accompanying drawings where it is also seen that this invention is provided with a vertically disposed center wire 14 that has its bottom end secured at 9 to the intersection of the aforesaid members 8 while each of the wires 12 are likewise secured at the center 13 of this invention. The upper end of the aforesaid center wire 14 is formed into the lifting ring 15 of this invention.

Continuing to look at FIGURE 1 of the accompanying drawing, it will be seen that the aforesaid round top frame 11 is formed in part into a plurality of equally spaced U-shaped configurations 16, there being one configuration for each of the cooking containers 17 that are placed within the confines of this just described container holder. It will be noted from reading the above description of the just-mentioned holder 5, that there is one of the rigid wires 12 between each of the food containers 17 which in this illustrated instance is a set of three containers.

Figure 2:
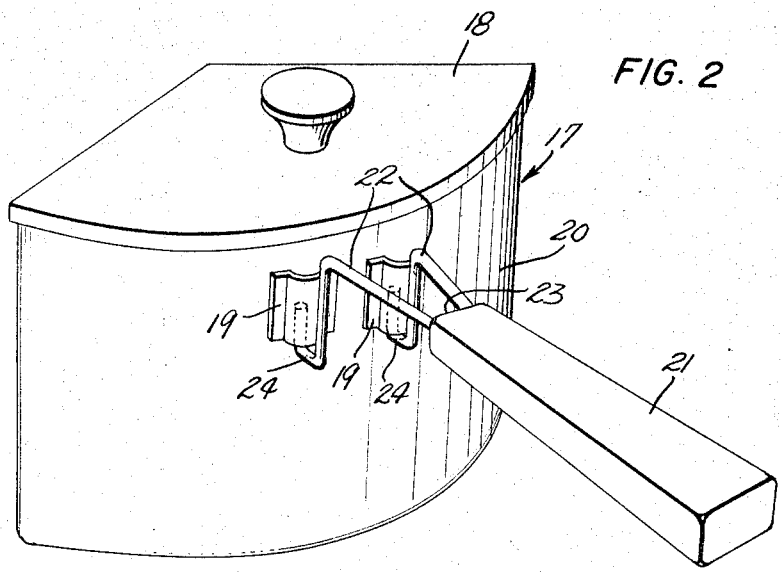
FIGURE 2 is a pictorial view of one of the cooking containers having its removable handle secured in place for lifting the container.

Directing one's attention now to FIGURE 2 of the accompanying drawing, it will be seen that this last-mentioned figure illustrates one of the containers 17 that are a part of this invention. Each container 17 is provided with a lid 18 as well as a pair of spaced U-shaped members 19 that are located on and secured to the curved side 20 of the container, which is in the shape of a circular sector when viewed from the top. A removable handle 21, that in the accompanying drawing has the configuration of a trapezoid when viewed from the top and a rectangle when viewed from either side or the back end, is provided with two rigid wires 22 that project outward from the small end 23 of the aforesaid handle 21 of which the handle holding part is made of any desired heat resisting material so one may not burn his hand if the food container 17 should be hot. Each one of the aforesaid rigid wires 22 have their outer end terminating in an upturned hook 24 that is adapted to the U-shaped member 19 when one desires to pick up the aforesaid food container 17. The handle 21 is of course disengaged from the food container after the food container has been placed within or removed from the holder 5.

While the above described invention has been entitled merely a "Holder for Multiple Cooking Containers," it will be seen from reading this specification that the containers themselves are included as a part of the invention, however, the holder can be configured and adapted to already existing food containers of the desired shape if one so wishes.

It is to be realized that changes in material and shape of the various details of this invention may be made in so long as the changes fall within the scope and intent of the appended claims.

What I claim as new is:

1. A cooking utensil comprising a holder and a plurality of containers,
   said holder having a bottom frame for supporting said containers and a top frame,
   (i) said frames lying in spaced-apart generally parallel planes,
   (ii) said bottom frame formed of a plurality of radially spaced concentric wires and a first set of radially extending wires, said radially extending wires meeting at the center of said bottom frame and connecting said concentric wires,
   (iii) said top frame formed by a curved outer wire having approximately the same radius of curvature as the outermost of said concentric wires and a second set of radially inwardly extending wires,
   a plurality of wires extending perpendicularly to said bottom frame from the outermost concentric wire to said outer wire,
   a center wire extending between the centers of said upper and lower frames and being secured to said first and second sets of radially extending wires,
   said upper frame being divided into sectors by said second set of radially extending wires,
   each of said containers having a bottom wall supported by said bottom frame and upwardly extending side walls,
   (i) one of said side walls being curved and having approximately the same radius of curvature as said outer wire,
   (ii) the side walls of each container defining in cross section a sector of substantially the same size as one of said upper frame sectors,
   whereby each of said containers may be removably supported in said holder.

2. A cooking utensil comprising a holder and a plurality of containers,
   said holder having a bottom frame for supporting said containers and a top frame,
   (i) said frames lying in spaced-apart generally parallel planes,
   (ii) said bottom frame formed of a plurality of radially spaced concentric wires and a first set of radially extending wires, said radially extending wires meeting at the center of said bottom frame and connecting said concentric wires,
   (iii) said top frame formed by a curved outer wire having approximately the same radius of curvature as the outermost of said concentric wires and a second set of radially inwardly extending wires,
   a plurality of wires extending perpendicularly to said bottom frame from the outermost concentric wire to said outer wire,
   a center wire extending between the centers of said upper and lower frames and being secured to said first and second sets of radially extending wires,
   said upper frame being divided into sectors by said second set of radially extending wires,
   each of said containers having a bottom wall supported by said bottom frame and upwardly extending side walls,
   (i) one of said side walls being curved and having approximately the same radius of curvature as said outer wire,
   (ii) the side walls of each container defining in cross section a sector of substantially the same size as one of said upper frame sectors,
   each of said containers including a handle bracket and a handle removably received by said bracket,
   said outer wire of said upper frame being interrupted in each of said upper frame sectors,
   the interrupted portions of said outer wire being joined by a downwardly extending generally U-shaped connector,
   each of said connectors extending downwardly below said brackets,
   whereby each of said containers may be removably supported in said holder, and
   said handles may be removed from said brackets while said containers are supported in said holder.

3. The structure of claim 1 in which one end of said center wire extends upwardly beyond said upper frame, said center wire end being bent to form a lifting hook.

4. The structure of claim 2 in which one end of said center wire extends upwardly beyond said upper frame, said center wire end being bent to form a lifting hook.

References Cited

UNITED STATES PATENTS

| | | | |
|---|---|---|---|
| 240,891 | 5/1881 | Cook | 220—85 |
| 923,445 | 6/1901 | Rose | 220—23.4 |
| 983,473 | 2/1911 | Barnes. | |
| 1,283,482 | 11/1918 | Durkee | 220—23.4 X |
| 1,924,406 | 8/1933 | Jester | 220—19 |
| 2,220,879 | 11/1940 | Hayden | 220—94 X |
| 2,624,487 | 1/1953 | Fry | 220—94 X |

FOREIGN PATENTS

| | | |
|---|---|---|
| 158,164 | 2/1921 | Great Britain. |
| 581,555 | 10/1946 | Great Britain. |
| 1,013,531 | 7/1952 | France. |

DONALD F. NORTON, *Primary Examiner.*

GEORGE E. LOWRANCE, *Examiner.*